(12) United States Patent
Kim

(10) Patent No.: US 8,317,341 B2
(45) Date of Patent: Nov. 27, 2012

(54) CUBE-CORNER TYPE SELF-REFLECTION SHEET HAVING IMPROVED TENSILE STRENGTH

(75) Inventor: Hyen Dae Kim, Ansan-si (KR)

(73) Assignee: Reflomax Co., Ltd., Seoul (KR)

(\*) Notice: Subject to any disclaimer, the term of this patent is extended or adjusted under 35 U.S.C. 154(b) by 150 days.

(21) Appl. No.: 12/668,131

(22) PCT Filed: Sep. 12, 2008

(86) PCT No.: PCT/KR2008/005426
§ 371 (c)(1),
(2), (4) Date: Jan. 7, 2010

(87) PCT Pub. No.: WO2009/035302
PCT Pub. Date: Mar. 19, 2009

(65) Prior Publication Data
US 2010/0195205 A1    Aug. 5, 2010

(30) Foreign Application Priority Data
Sep. 15, 2007   (KR) .................. 10-2007-0093922

(51) Int. Cl.
*G02B 5/124* (2006.01)
(52) U.S. Cl. ........................... 359/530; 359/529
(58) Field of Classification Search .......... 359/529–533, 359/831, 833–834, 836–837
See application file for complete search history.

(56) References Cited

U.S. PATENT DOCUMENTS

| | | |
|---|---|---|
| 5,637,173 A | 6/1997 | Martin et al. |
| 6,238,772 B1 | 5/2001 | Paul et al. |
| 7,364,314 B2 * | 4/2008 | Nilsen et al. .................. 359/530 |
| 2003/0129359 A1 | 7/2003 | Demott et al. |

FOREIGN PATENT DOCUMENTS

| | | |
|---|---|---|
| GB | 1424754 A | 2/1976 |
| JP | 2003-342539 A | 12/2003 |
| KR | 10-2001-0112388 A | 12/2001 |
| KR | 10-2006-0110086 B1 | 10/2006 |

OTHER PUBLICATIONS

PCT International Search Report of Int'l Application No. PCT/KR2008/005426.
PCT Written Opinion of the International Search Authority for Int'l Application No. PCT/KR2008/005426.
Office Action and Supplementary European Search Report issued by EPO and dated Oct. 12, 2011.
PCT International Search Report of Int'l Application No. PCT/KR2008/005426; Feb. 27, 2009.
PCT Written Opinion of the international Search Authority for Int'l Application No. PCT/KR2008/005426; Feb. 27, 2009.

\* cited by examiner

*Primary Examiner* — James Phan
(74) *Attorney, Agent, or Firm* — Kile Park Goekjian Reed & McManus PLLC

(57) ABSTRACT

Disclosed is a retroreflective sheet using a cube-corner type retroreflection principle, which is composed of a body layer which includes a flexible transparent thermoplastic sheet made of a transparent material for high light transmittance and having a smooth surface as a front surface and also includes a woven fabric disposed therein, and a cube-corner type microprism layer having a retroreflective function formed on a surface of the body layer including the transparent thermoplastic sheet and the woven fabric in an integrated form, opposite the front surface. The retroreflective sheet has a configuration in which the woven fabric having high tensile strength is inserted into the transparent thermoplastic polymer (PVC, TPU, PO, or acryl) sheet, and is suitable for end uses requiring high tensile force.

2 Claims, 4 Drawing Sheets

CUBE-CORNER TYPE SELF-REFLECTION SHEET HAVING IMPROVED TENSILE STRENGTH

TECHNICAL FIELD

The present invention relates to a cube-corner type retroreflective sheet having improved tensile strength, and particularly to a retroreflective sheet having a configuration in which a woven fabric having high tensile strength is inserted into a transparent thermoplastic polymer (PVC, TPU, PO, PC, or acryl) sheet, thus making it suitable for application to fields requiring high tensile strength.

BACKGROUND ART

General examples of a conventional retroreflective product 10 mainly include retroreflective products formed by applying heat and pressure to a transparent thermoplastic polymer sheet thus forming a cube-corner shape, or those made of two kinds of materials so that a cube-corner shape is formed using a thermosetting resin on one surface of a flexible polymer sheet.

Such a retroreflective product 10 has optical properties (the retroreflective function) in which incident light 11 enters a sheet of the retroreflective product 10, passes through a transparent polymer layer, and then is completely reflected off the inner surface of a cube-corner type retroreflective device such that reflected light 12 is emitted out backwards in a direction parallel to the incident light 11.

Thus, the retroreflective product 10 is variously processed for application to traffic signboards, safety clothes or safety indicators for construction work structures. However, the transparent thermoplastic polymer sheet chiefly used therein is disadvantageous because it easily tears due to its low tensile strength when used for purposes (e.g., signboards, banner advertisements, packages) requiring high tensile strength (10 kg/cm² or more), such as a flex used for advertisements, and thus it is unsuitable for such purposes.

So, the retroreflective product is mainly used by attaching it to a target using an adhesive or through sewing.

In the case of a flex (a sheet in which a woven fabric is integratedly disposed in the middle portion of a white thermoplastic sheet) used for most signboards and billboards, it enables the signboard or billboard to be visible, at night time only when under external illumination or if an illuminator is attached to the back surface thereof. However, such a flex suffers because the information contained thereon is not sufficiently conveyed to people in the absence of electric power or an additional illuminator.

DISCLOSURE

Technical Problem

Accordingly, the present invention has been made keeping in mind the above problems occurring in the related art, and the present invention provides a cube-corner type retroreflective sheet having improved tensile strength. In order to manufacture such a cube-corner type sheet also having retroreflective effects in which incident light entering from a light source and reflected light emitted through a cube-corner structure are put in parallel to each other, a woven fabric (e.g., polyester, nylon, etc.) having high tensile strength is inserted into a transparent thermoplastic sheet, thus imparting retroreflective effects and high tensile strength thereto, thereby making it possible to apply the retroreflective sheet of the present invention to fields in which the use of conventional retroreflective sheets has hitherto been limited.

Technical Solution

In order to accomplish the above technical problem, the present invention provides a cube-corner type retroreflective sheet having improved tensile strength, which is composed of a body layer including a flexible transparent thermoplastic sheet made of a transparent material for high light transmittance and having a smooth surface as a front surface and also including a woven fabric disposed therein, and a cube-corner type microprism layer having a retroreflective function formed on a surface of the body layer including the transparent thermoplastic sheet and the woven fabric in an integrated form, opposite the front surface.

The woven fabric included inside the body layer consists of warp and weft yarns woven in a lattice form for imparting high tensile strength and disposed in the middle portion of the body layer.

The yarns of the woven fabric included inside the body layer may be formed of polyester or nylon.

The cube-corner type microprism layer having a retroreflective function may be formed by directly forming cube-corner type microprisms on the inner surface of the transparent thermoplastic sheet or by layering additional cube-corner type microprisms using a thermosetting material on the surface of the thermoplastic sheet.

The transparent thermoplastic sheet 102 may be formed of PVC (Poly Vinyl Chloride), TPU (Thermoplastic PolyUrethane), PO (Poly Olefin), or acryl.

In addition, the present invention provides a cube-corner type retroreflective sheet having improved tensile strength, which is composed of a body layer including a flexible transparent thermoplastic sheet made of a transparent material for high light transmittance and having a smooth surface as a front surface and also including a woven fabric having superior tensile and tearing strength disposed therein, a cube-corner type microprism layer having a retroreflective function formed on a surface of the body layer including the transparent thermoplastic sheet and the woven fabric in an integrated form, opposite the front surface, and a coating surface provided on the front surface to improve printability performed by means of an pigmented solvent- or water-based digital ink jet printer.

ADVANTAGEOUS EFFECTS

According to the present invention, a cube-corner type retroreflective sheet maximally ensures a retroreflective area, thus maximizing retroreflective effects and realizing tensile and tearing strength. When the retroreflective sheet of the present invention is used at night time, drivers or walkers can notice advertisements and information or locations of construction work structures due to retroreflective effects based on lighting supplied by passing vehicles even in the absence of an additional illuminator.

Also, when the retroreflective sheet of the present invention is used along with an illuminator, illumination and retroreflective effects can be simultaneously realized, thus maximizing information conveyance effects. Further, in emergencies, specifically, even when an illuminator is not operating effectively, retroreflective performance can be continued uninterruptedly.

DESCRIPTION OF THE ELEMENTS IN THE DRAWINGS

| | |
|---|---|
| 100: retroreflective sheet | 102: thermoplastic sheet |
| 110: front surface | 120: woven fabric |
| 122: warp yarn | 124: weft yarn |
| 126: ground yarn | 130: body layer |
| 140: microprism layer | 150: coating surface |

BEST MODE

Hereinafter, a detailed description will be given of the present invention with reference to the accompanying drawings.

Figure 1:
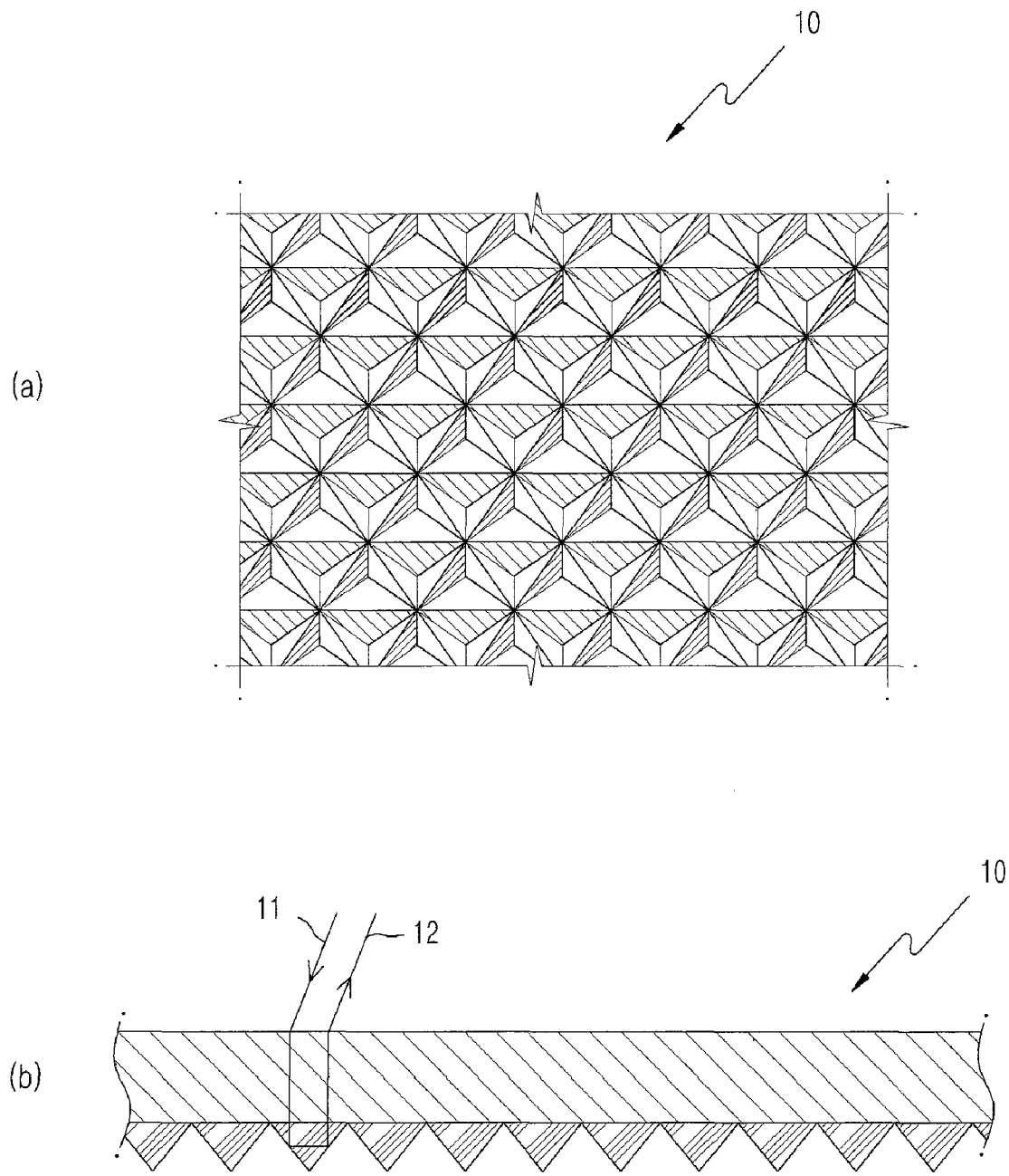
FIG. 1 is a view showing a conventional cube-corner type retroreflective product.
Figure 2:
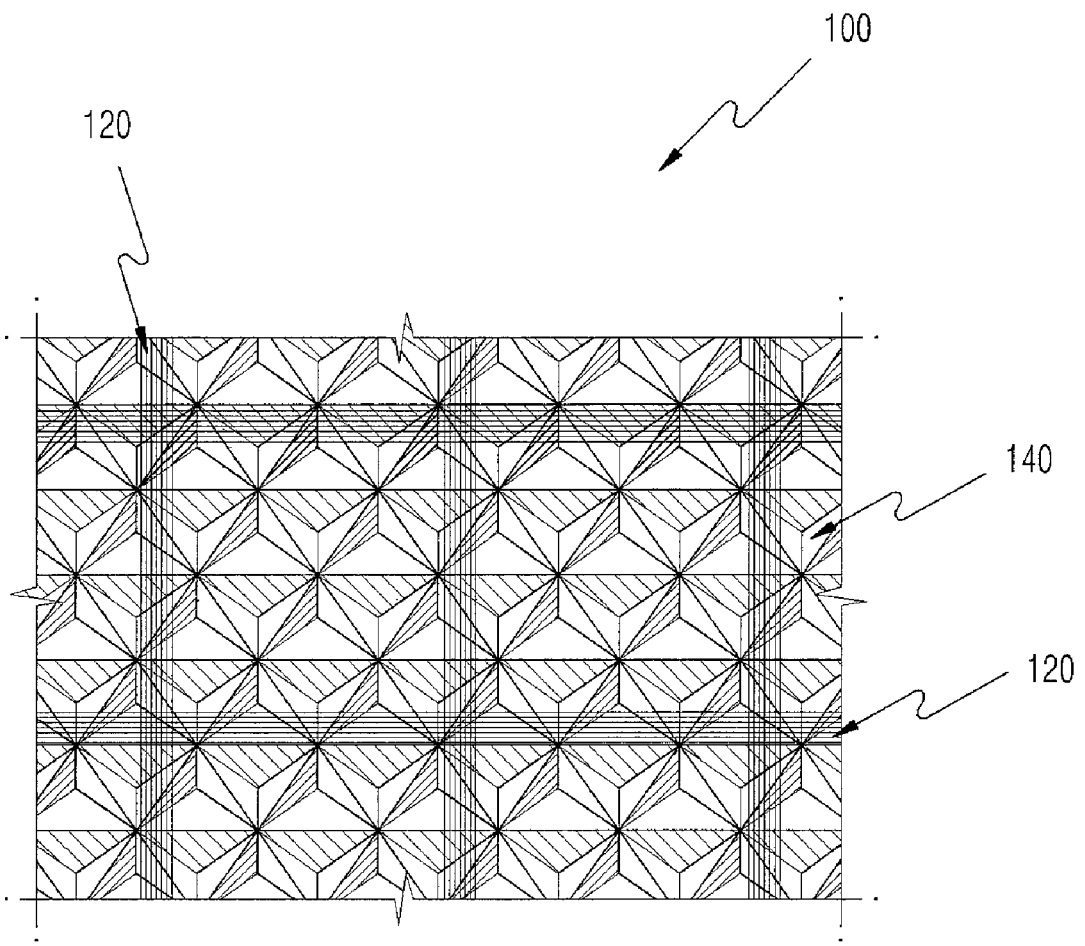
FIG. 2 is a top plane view showing a cube-corner type retroreflective sheet according to a first embodiment of the present invention.
Figure 3:
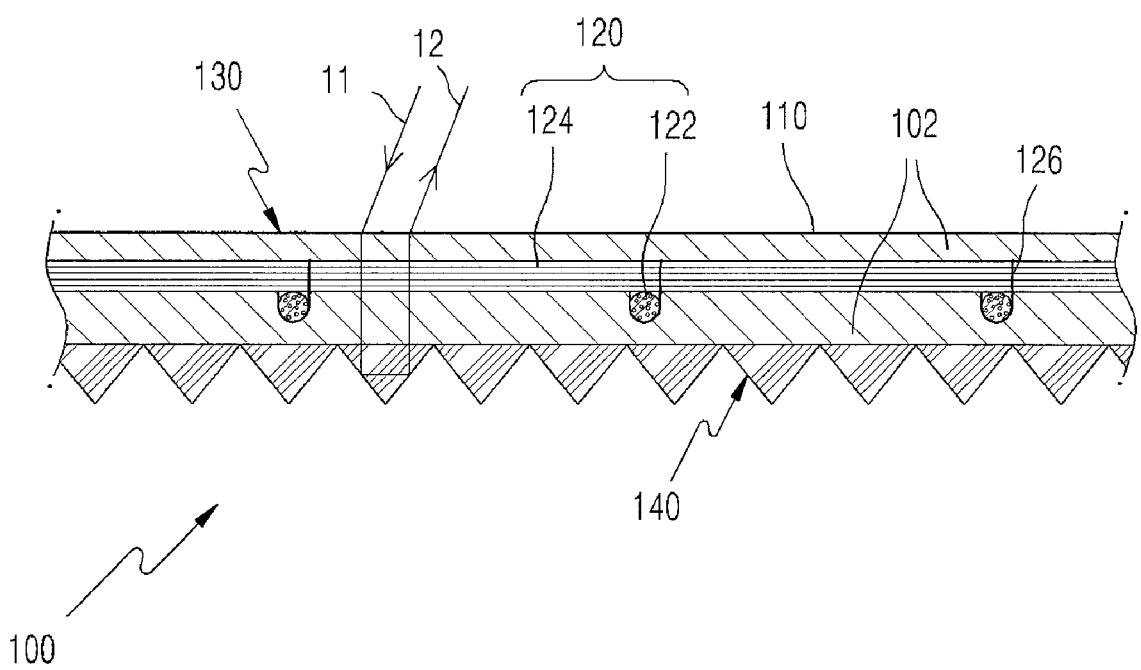
FIG. 3 is a side cross-sectional view showing the cube-corner type retroreflective sheet according to the first embodiment of present invention.

FIG. 2 is a top plan view showing a cube-corner type retroreflective sheet according to a first embodiment of the present invention, and FIG. 3 is a side cross-sectional view showing the cube-corner type retroreflective sheet according to the first embodiment of present invention.

The retroreflective sheet 100 is manufactured by applying heat and pressure to a transparent polymer sheet thus forming a cube-corner shape or is made of two kinds of materials so that a cube-corner shape is formed using a thermosetting resin on a flexible thermoplastic polymer sheet.

The retroreflective sheet 100 thus obtained has optical properties (the retroreflective function) in which incident light 11 enters a front surface 110, passes through a transparent polymer layer, and then is completely reflected off the inner surface of a cube-corner type retroreflective device such that reflected light 12 is emitted out backwards in a direction parallel to the incident light 11.

Further, the cube-corner type retroreflective device is manufactured by forming a thermoplastic resin layer having a predetermined thickness on a lower surface of a body layer 130 and then forming on the thermoplastic resin layer a plurality of cube-corner type retroreflectors each having a triangular pyramid shape, the three faces of which are congruent with the exception of its bottom face (hereinafter, referred to as the "retroreflective surface") attached to the body layer 130.

According to the present invention, the cube-corner type retroreflective sheet 100 having improved tensile strength is composed of a body layer 130 which includes a flexible transparent thermoplastic sheet 102 made of a transparent material for high light transmittance and having a smooth surface as a front surface 110 and also includes a woven fabric 120 having superior tensile and tearing strength disposed therein, and a cube-corner type microprism layer 140 having a retroreflective function formed on a surface of the body layer 130 including the transparent thermoplastic sheet 102 and the woven fabric 120 in an integrated form, opposite the front surface.

When light is transmitted through the cube-corner type retroreflective sheet 100, it can be observed in the wide range not only from a forward position but also from other directions.

Further, the woven fabric 120 included inside the body layer 130 consists of warp yarns 122 and weft yarns 124 woven in a lattice form and disposed in the middle portion of the body layer 130.

In the body layer 130, intersections of the warp yarns 122 and the weft yarns 124 woven in the lattice form are bound with thin ground yarns 126 so that the warp yarns 122 and the weft yarns 124 are held together.

The yarns of the woven fabric 120 included inside the body layer 130 used in this way are formed of polyester or nylon.

Specifically, the cube-corner type retroreflective sheet 100 has a configuration in which the woven fabric having high tensile strength is inserted into the transparent thermoplastic polymer (PVC, TPU, acryl, etc.) sheet.

Also, the cube-corner type microprism layer 140 having a retroreflective function is formed by directly forming cube-corner type microprisms on the inner surface of the transparent thermoplastic sheet 102 or by layering additional cube-corner type microprisms using a thermosetting material on the surface of the thermoplastic sheet.

The transparent thermoplastic sheet 102 is formed of PVC (Poly Vinyl Chloride), TPU (Thermoplastic Poly Urethane), PO (Poly Olefin), or acryl.

Figure 4:
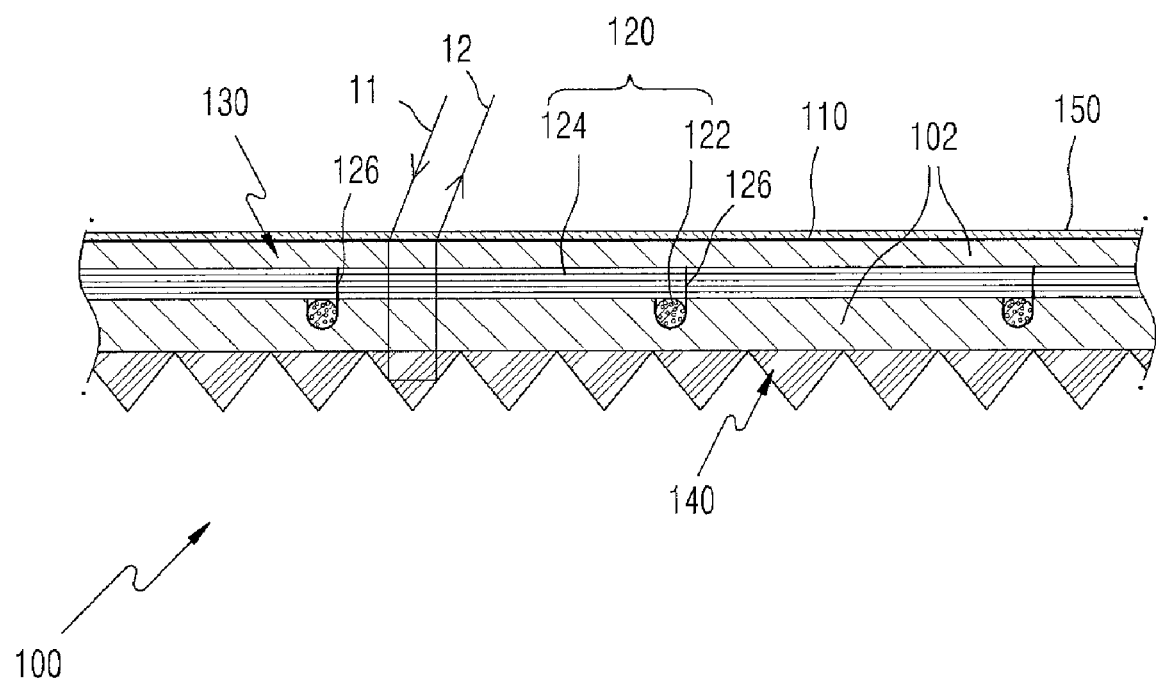
FIG. 4 is a view showing a cube-corner type retroreflective sheet according to a second embodiment of the present invention.

In addition, according to a second embodiment of the present invention, as shown in FIG. 4, a cube-corner type retroreflective sheet 100 having improved tensile strength is composed of: a body layer 130 which includes a flexible transparent thermoplastic sheet 102 made of a transparent material for high light transmittance and having a smooth surface as a front surface 110 and also includes a woven fabric 120 having superior tensile and tearing strength disposed therein, a cube-corner type microprism layer 140 having a retroreflective function formed on a surface of the body layer 130 including the transparent thermoplastic sheet 102 and the woven fabric 120 in an integrated form, opposite the front surface, and a coating surface 150 provided on the front surface to improve printability performed by means of an pigmented solvent- or water-based digital ink jet printer.

As mentioned above, the cube-corner type retroreflective sheet 100 having improved tensile strength according to the present invention is provided in the form of a retroreflective sheet 100 having high tensile strength (10 kg/cm$^2$ or more, based on a cut strip method FS #191 5102) and high tearing strength (5 kg, based on a trapezoid manner FS #191 5136) by processing one surface of a sheet having a structure suitable for use as a flex and made of a transparent polymer material for passing light therethrough to have a fine cube-corner shape so as to induce retroreflective effects and the other surface thereof to be smooth.

INDUSTRIAL APPLICABILITY

As described hereinbefore, fabric made using the cube-corner type retroreflective sheet 100 having improved tensile strength according to the present invention can be widely applied to a variety of fields, for example, clothes, bags, shoes, headgear, and various covering materials.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A cube-corner type retroreflective sheet having improved tensile strength, comprising:
   a front surface into which incident light enters,
   a microprism layer that reflects the incident light back to the front surface, and
   a body layer which is disposed between the front surface and the microprism layer and includes a flexible transparent thermoplastic sheet made of a transparent material for high light transmittance and a woven fabric inserted into the flexible transparent thermoplastic sheet.

2. The cube-corner type retroreflective sheet according to claim 1, wherein the woven fabric included inside the body layer comprises warp yarns and weft yarns woven in a lattice form and disposed in the body layer.

* * * * *